United States Patent Office 3,091,642
Patented May 28, 1963

3,091,642
PROCESS FOR PREPARING HEXAALKYL-1,3,5-CYCLOHEXANETRIONES
Ronald G. Nations, Kingsport, Tenn., assignor to Eastman Kodak Company, Rochester, N.Y., a corporation of New Jersey
No Drawing. Filed May 9, 1960, Ser. No. 27,529
7 Claims. (Cl. 260—586)

This invention relates to a process for preparing alicyclic ketones, and more particularly to a process for transforming tetraalkyl-1,3-cyclobutanediones, which are more commonly known as dimers of dialkylketenes or as dimers of ketoketenes, to corresponding alicyclic triketones, i.e. hexaalkyl-1,3,5-cyclohexanetriones.

Alicyclic triketones are known. For example, hexamethyl-1,3,5-cyclohexanetrione or hexamethyl phloroglucinol has been prepared by a process wherein phloroglucinol as methylated by means of methyl iodide and alkali [Richter's Org. Chem. vol. III, 3rd Edition, Aromatic Compounds, page 231, Elsevier Publishing Co. Inc., New York, New York (1946)]. However, the prior art processes have not proven satisfactory for one reason or another for commercial production of hexamethyl-1,3,5-cyclohexanetrione and related compounds. I have now found that by heating dimers of dialkylketenes, i.e., tetraalkyl-1,3-cyclobutanediones, with certain alkali-metal alcoholates, transformation to the corresponding hexaalkyl-1,3,5-cyclohexanetriones takes place readily with good yields, and the process is well adapted to commercial production of such alicyclic triketones. These are useful as chemical intermediates. For example, they may be hydrogenated to the corresponding trihydric alcohols for the preparation of alkyd resins, or the alcohols may be converted to esters which can be used as high temperature lubricants or plasticizers in applications requiring high thermal and oxidative stability.

It is, accordingly, an object of the invention to provide a novel and economically feasible process for the preparation of hexaalkyl-1,3,5-cyclohexanetriones. Another object is to convert dimeric dialkylketenes to the corresponding trimers. Other objects will become apparent hereinafter.

In accordance with the invention, I prepare hexaalkyl-1,3,5-cyclohexanetriones by heating a dimeric dialkylketene with an alkali metal alkoxide as catalyst until the transformation to the trimer is substantially complete, followed by separation and purification of this product by distillation, crystallization, or other conventional techniques. The reaction takes place according to the following scheme:

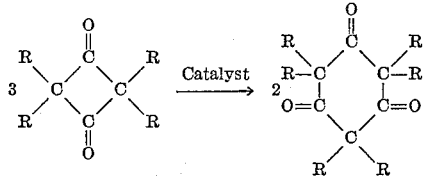

wherein each R represents a straight or branched chain alkyl group of from 1–4 carbon atoms, e.g. methyl, ethyl, propyl, isopropyl, butyl, etc. groups. Suitable dimers of dialkyl ketenes include tetramethyl-1,3-cyclobutanedione, tetraethyl-1,3-cyclobutanedione, tetrapropyl-1,3-cyclobutanedione, tetraisopropyl-1,3-cyclobutanedione, tetrabutyl-1,3-cyclobutanedione, 2,4-dimethyl-2,4-diethyl-1,3-cyclobutanedione, 2,4-dimethyl-2,4-dipropyl-1,3-cyclobutanedione, 2,4-dimethyl-2,4-dibutyl-1,3-cyclobutanedione, 2,4-diethyl-2,4-dipropyl-1,3-cyclobutanedione, 2,4-dipropyl-2,4-dibutyl-1,3-cyclobutanedione, etc. Dimers of mixed dialkylketenes can also be used, e.g. 2,2-dimethyl-4,4-diethyl-1,3-cyclobutanedione, 2,2-dimethyl-4,4-ethylpropyl-1,3-cyclobutanedione, etc.

Suitable alkoxide catalysts have the general formula:

MOR wherein R is as previously defined and M represents an alkali metal atom of group IA of Mendeléeff's periodic table of elements. Of particular value in the process of the invention are the alkoxides prepared from sodium, potassium and lithium metals and lower molecular weight saturated, aliphatic monohydric alcohols. Especially useful are the alkoxides of these metals prepared from methyl, ethyl, propyl, butyl, isobutyl, etc. alcohols, e.g. sodium methoxide, sodium ethoxide, sodium propoxide, sodium butoxide, sodium isopropoxide, sodium isobutoxide, etc. and the alkoxides of potassium and lithium metals.

The process of this invention is operable within wide limits of temperature, pressure and catalyst concentrations. The catalyst concentration may range from as little as 0.0001% to as much as 50%, however, the preferred range is from about 0.01% to about 2%. The process may be carried out conveniently at atmospheric pressure, but elevated or reduced pressures may be used. Elevated pressures as high as 100 atmospheres or higher and reduced pressures of 200 mm. Hg or lower may be used. For most operations of the process of this invention, pressures from about 650 mm. Hg to about 5 atmospheres are preferred.

The reaction temperature required for best results may vary with the particular tetraalkyl-1,3-cyclobutanedione subjected to the process of this invention. The temperature will depend upon the pressure under which the operation is carried out and will be further subject to modification by the presence of any suitable solvent which might be used. In general the process of this invention will operate at temperatures as low as 90° C. and as high as 375° C., the preferred range is from about 110° C. to near the normal boiling point of the specific diketone. The boiling points of most of these diketones are in the range of from about 140° C. to about 250° C.

A solvent may or may not be used in the operation of the process of this invention. If used, it is necessary to select a solvent which will not react with the catalyst, with the starting material or with the product. Suitable solvents are hydrocarbons, ethers and the like. Some specific compounds which may be used as solvents are n-heptane, toluene, the xylenes, diphenyl ether and the like. The amount of solvent may vary over a wide range which can be as little as about 1/50 part to as much as 20 parts per part of starting tetraalkyl-1,3-cyclobutanedione.

The following will serve to illustrate further the process of my invention.

*Example 1*

A mixture of 1000 parts of tetramethyl-1,3-cyclobutanedione and 1000 parts of xylene was heated with 10 parts of sodium methoxide to about 85–90° C. External heating was stopped and the reaction mixture refluxed spontaneously for 45 min. After additional refluxing for two hours the xylene was removed by distillation. Continued distillation of the reaction mixture gave 881 parts (88.1% yield) of hexamethyl-1,3,5-cyclohexanetrione, B.P. 245–247° C., M.P. 78–80° C. Recrystallization from ethanol gave white needles, M.P. 80° C.

*Example 2*

A mixture of 500 parts of tetramethyl-1,3-cyclobutanedione, 1.5 parts of clean potassium metal and 2 parts of anhydrous ethyl alcohol was heated to 150° C. for eight hours. The reaction mixture was distilled to give 470 parts (94% yield) of hexamethyl-1,3,5-cyclohexanetrione, B.P. 245° C./735 mm. Hg.

Example 3

A mixture of 40 parts of tetramethyl-1,3-cyclobutanedione and 15 parts of purified sodium methoxide was heated to 150° C. for 90 min. After the reaction mixture was cooled, water was added and the resulting slurry was extracted with ether. The ether layer was separated and washed with water, dried and evaporated to give 12 parts of hexamethyl-1,3,5-cyclohexanetrione, M.P. 78-79° C. Recrystallization from ethanol-petroleum ether gave crystals, M.P. 80° C.

*Anal.*—Calcd. for $C_{12}H_{18}O_3$: C, 68.6; H, 8.6. Found: C, 68.67; H, 8.49.

In place of the potassium in the above example, there may be substituted other alkali metals such as sodium or lithium or alkali metal hydrides, such as sodium hydride, potassium hydride or lithium hydride to give similar results.

Example 4

A mixture of 88 g. of 2,4-dimethyl-2,4-diethyl-1,3-cyclobutanedione and 2 g. of sodium methoxide was heated to reflux for 90 min. The crude reaction mixture was distilled to give 62.5 g., equivalent to a yield of 71% of 2,4,6-trimethyl-2,4,6-triethyl-1,3,5 - cyclohexanetrione, B.P. 274° C./760 mm., B.P. 123° C./4 mm. Hg, $n_D^{20}$ 1.4796.

*Anal.*—Calcd. for $C_{15}H_{24}O_3$: C, 71.4; H, 9.52. Found: C, 71.28; H, 9.40.

By proceeding in accordance with the procedures of the above examples, other of the hexaalkyl-1,3,5-cyclohexanetriones coming within the general formula for this case of triketones can be prepared by substituting for the tetramethyl-1,3-cyclobutanedione in the above examples an equivalent amount of any other of the tetraalkyl-1,3-cyclobutane diones mentioned as being suitable for carrying out the process of the invention. Thus, tetraethyl-1,3-cyclobutanedione gives hexaethyl-1,3,5-cyclohexanetrione; tetrapropyl-1,3-cyclobutanedione gives hexapropyl-1,3,5 - cyclohexanetrione; tetraisopropyl-1,3-cyclobutanedione gives hexaisopropyl-1,3,5-cyclohexanetrione; tetrabutyl-1,3-cyclobutanedione gives hexabutyl-1,3,5-cyclohexanetrione, etc. As indicated previously, all of the alicyclic triketone products of the invention are useful as chemical intermediates. Particularly, are the products useful when hydrogenated to the corresponding trihydric alcohols, i.e. hexaalkyl-1,3,5-cyclohexanetriols. Fatty and aromatic acid esters of these alcohols are especially useful as high temperature lubricants and plasticizers. Further, the alcohols are useful in forming alkyd resins.

What I claim is:

1. A process for preparing a hexaalkyl-1,3,5-cyclohexanetrione which comprises heating a tetraalkyl-1,3-cyclobutanedione, wherein in each instance the said alkyl group contains from 1-4 carbon atoms, at from 90-375° C., in the presence of an alkoxide of an alkali metal and a monohydric aliphatic alcohol containing from 1-4 carbon atoms.

2. A process for preparing hexamethyl-1,3,5-cyclohexanetrione which comprises heating tetramethyl-1,3-cyclobutanedione, at from 110-250° C., in the presence of sodium methoxide.

3. A process for preparing hexaethyl-1,3,5-cyclohexanetrione which comprises heating tetraethyl-1,3-cyclobutanedione, at from 110-250° C., in the presence of sodium methoxide.

4. A process for preparing hexapropyl-1,3,5-cyclohexanetrione which comprises heating tetrapropyl-1,3-cyclobutanedione, at from 110-250° C., in the presence of sodium methoxide.

5. A process for preparing hexaisopropyl-1,3,5-cyclohexanetrione which comprises heating tetraisopropyl-1,3-cyclobutanedione, at from 110-250° C., in the presence of sodium methoxide.

6. A process for preparing hexabutyl-1,3,5-cyclohexanetrione which comprises heating tetrabutyl-1,3-cyclobutanedione, at from 110-250° C., in the presence of sodium methoxide.

7. The process of claim 1 wherein a solvent selected from the group consisting of n-heptane, toluene, xylene and diphenyl ether is used as the reaction medium.

References Cited in the file of this patent

Felix et al.: Helv. Chim. Acta, Vol. 8, pages 322-329 (1925).